United States Patent [19]

Sulzer et al.

[11] Patent Number: 5,598,914
[45] Date of Patent: Feb. 4, 1997

[54] REMOVABLE SIDEWALL FOR A MOLDED SPIRAL CHUTE

[75] Inventors: James E. Sulzer, Colorado Springs; John Ivey, Canon City, both of Colo.

[73] Assignee: Portec, Inc., Oak Brook, Ill.

[21] Appl. No.: 428,375

[22] Filed: Apr. 25, 1995

[51] Int. Cl.⁶ .................................................. B65G 11/00
[52] U.S. Cl. .............................................. 193/12; 193/34
[58] Field of Search .................................. 193/2, 3, 4, 12, 193/13, 25 R, 33, 34, 2 R, 46

[56] References Cited

U.S. PATENT DOCUMENTS

| 798,622 | 9/1905 | Pollock | 193/12 X |
|---|---|---|---|
| 803,119 | 10/1905 | Logan | 193/12 X |
| 1,005,391 | 10/1911 | Williams | 193/12 |
| 5,083,651 | 5/1992 | Wiese | 193/12 |

FOREIGN PATENT DOCUMENTS

| 1073948 | 1/1960 | Germany | 193/12 |
|---|---|---|---|
| 2609797 | 9/1977 | Germany | 193/12 |
| 3010271 | 9/1981 | Germany | 193/12 |
| 3300744 | 4/1984 | Germany | 193/12 |
| 1490100 | 10/1977 | United Kingdom | 193/12 |
| 2148857 | 6/1985 | United Kingdom | 193/12 |

Primary Examiner—Frank E. Werner
Attorney, Agent, or Firm—Klaas, Law, O'Meara & Malkin, P.C.

[57] ABSTRACT

A plurality of spiral sidewall sections are provided and are connected to the center support pole of a spiral chute which is used to transport articles from an upper location to a lower location to provide a sidewall located between the original sidewall of the spiral chute and the center support pole.

11 Claims, 1 Drawing Sheet

REMOVABLE SIDEWALL FOR A MOLDED SPIRAL CHUTE

Field of the Invention

This invention relates generally to a molded spiral chute that is used to transport articles from an upper location to a lower location and more specifically, to the provision of a desired sidewall for such a molded spiral chute.

BACKGROUND OF THE INVENTION

There are many molded spiral chutes in use for transporting articles from an upper location to a lower location. In many instances, these molded spiral chutes comprise a plurality of molded spiral sections secured together around a center pole. Each of the spiral sections has an upper surface and a sidewall having a predetermined radius. When an article is descending down the molded spiral chute, the gravitational and centrifugal forces will move the article against the sidewall. Depending on the size and weight of the articles descending over the molded spiral chute, this could have an adverse effect such as the spinning and/or tumbling of the articles. This problem is really significant if the spiral chute is used with an automated routing system that relies on reading the bar code on the article.

BRIEF DESCRIPTION OF THE INVENTION

This invention provides a plurality of spiral sidewall sections that may be mounted on a conventional spiral chute to provide a sidewall having a desired radius.

In a preferred embodiment of the invention, a spiral chute is provided with a sidewall having a desired radius and located between the center support pole and the original sidewall. The sidewall is formed using a plurality of spiral sidewall sections each having an inner surface and an outer surface. Support means are provided for supporting each of the spiral sidewall sections on the center support pole of the spiral chute. Each of the support means has a support arm secured to the center support pole and extending outwardly therefrom, preferably at an angle of about ninety degrees. A hanger arm is secured to the support arm and depends downwardly therefrom, preferably at an angle of about ninety degrees. Mounting means are provided for mounting each spiral sidewall section on the hanger arm. A first brace arm extends between and is secured to the support arm and the center support pole. A second brace arm extends between and is secured to the support arm and the hanger arm. Each of the plurality of spiral sidewall sections has an upper edge and a lower edge. Adjusting means are provided for locating the lower edge at a desired distance above the upper surface of the spiral chute. A slip joint or other types of joining means is provided for joining the lower end portion of an upper one of a spiral sidewall section and the upper end portion of a lower one of a spiral sidewall section.

BRIEF DESCRIPTION OF THE DRAWING

An illustrative and presently preferred embodiment of the invention is illustrated in the drawing in which:

FIG. 2 is an elevational view with parts in section of a portion of a spiral sidewall section of this invention;

FIG. 3 is a top plan view of portions of adjacent spiral sidewall sections of this invention;

FIG. 4 is an elevational view of FIG. 3;

FIG. 5 is an enlarged elevational view of a portion of FIG. 2; and

FIG. 6 is a top plan view of FIG. 5.

DETAILED DESCRIPTION OF THE INVENTION

Figure 1:
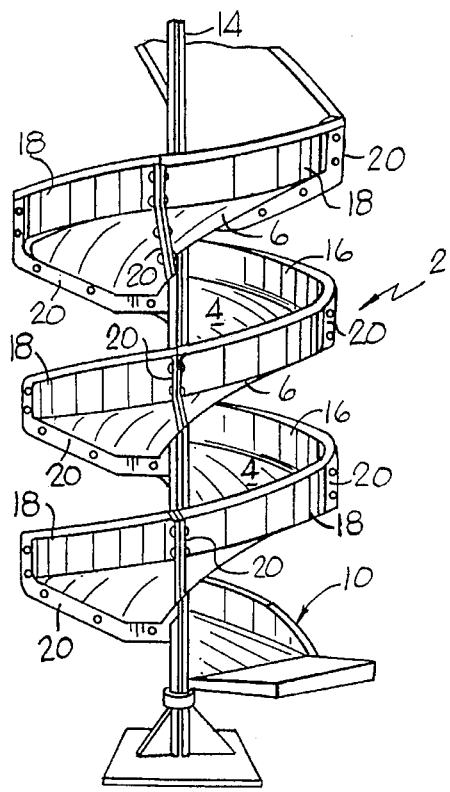
FIG. 1 is an elevational view of a spiral chute of the prior art.

This invention is for use with a spiral chute 2, such as that illustrated and described in U.S. Pat. No. 4,726,456 which is incorporated herein by reference thereto. In FIG. 1, there is a schematic illustration of a molded fiberglass spiral chute 2. The molded fiberglass spiral chute 2 has an upper surface 4 on a load support wall 6 over which articles move from an upper location 8 to a lower location 10. Extending vertically from the upper surface 4 is a vertical inner wall 12 formed by the periphery of the center support pole 14 on which the molded fiberglass chute 2 is supported and a vertical outer wall 16 integrally molded with the load supporting wall 6. The transition portion between the upper surface 4 and the vertical outer wall 16 is suitably radiused so as to provide a continuous smooth surface. As illustrated in FIG. 1, the molded fiberglass spiral chute 2 is formed by a plurality of spiral sections 18, each of which comprises a spiral turn of 90 degrees of revolution with adjacent spiral sections being secured together by bolted flanges 20. If desired, the spiral sections 18 can extend for 180 degrees, 360 degrees or any desired extent.

This invention provides a plurality of spiral sidewall sections 22 preferably formed from metal such as twelve gauge stainless steel. Each of the spiral sidewall sections 22 has a spiral turn of ninety, one hundred and eighty, or three hundred and sixty degrees or any other desired extent.

Support means are provided for supporting each spiral sidewall section 22 at a desired location. A support arm 24 is secured to a plate 26 by suitable means, such as by welding (not shown) which plate 26 is secured to the center support pole 14 by suitable means, such as threaded bolts in threaded openings (not shown). A hanger arm 28 extends downwardly from the support arm 24 and is secured thereto by suitable means, such as a bolt and a nut (not shown). A first brace arm 30 extends between the center support pole 14 and the support arm 24. One end 32 of the first brace arm 30 is secured to the support arm 24 by suitable means, such as by a bolt and a nut (not shown) and the other end 34 of the first brace arm 30 is secured to a plate 36 by suitable means such as by welding (not shown) and which plate 36 is secured to the center support pole 14 by suitable means, such as threaded bolts in threaded openings (not shown). A second brace arm 38 extends between the support arm 24 and the hanger arm 28. One end 40 of the second brace arm 38 is secured to the support arm 24 by suitable means, such as a bolt and a nut (not shown) and the other end 42 of the second brace arm 38 is secured to the hanger arm 28 by suitable means, such as a bolt and a nut (not shown).

Mounting means are provided for adjustably mounting each spiral sidewall section 22 on the hanger arm 28. A mounting plate 44 is secured to each spiral sidewall section 22 by suitable means, such as by welding (not shown) and has a flange 46 which is dimensioned to mate with a flange 48 on the hanger arm 28. The mounting plate 44 is not illustrated in FIG. 2. The flange 46 has two space apart slots 50 and the flange 48 has two spaced apart openings 52 to that each spiral sidewall section 22 may be adjustably mounted on the hanger arm 28 using bolts and nuts (not shown). Each spiral sidewall section is preferably mounted to be slightly spaced from the upper surface 4. For a spiral sidewall section 22 having an extent of one hundred and eighty degrees, two mounting plates 44 and two hanger arms 28 are preferably used, one at the end of the first forty-five degrees of extent and the other at the beginning of the last forty-five degrees of extent. However, it is understood that one or more than two mounting plates 44 and hanger arms 28 may be used.

Each of the spiral sidewall sections 22 has an inner surface 60 and an outer surface 62. Joining means are provided for joining together the adjacent end portions of adjacent spiral sidewall sections 22. The joining means are illustrated in FIGS. 3 and 4. An angled plate 64 has a first portion 66 secured to the outer surface 62 of the spiral sidewall section 22 by suitable means, such as by welding (not shown) and a second portion 68 spaced a distance from the outer surface 62 so that the end portion 70 of a spiral sidewall section 22 may be inserted therein. The angled plate 64 is preferably located at the end portion 72 of an upper spiral sidewall section 22.

The radius of each spiral sidewall section 22 is governed by the size of the articles to be passed over the upper surface 4, but all of the spiral sidewall sections 22 for any particular size of articles must have the same radius. As illustrated in FIG. 2, the spiral sidewall sections 22 are located between the center support pole 14 and the vertical sidewall 16.

While an illustrative and presently preferred embodiment of the invention has been described in detail herein, it is to be understood that the inventive concepts may be otherwise variously embodied and employed and that the appended claims are intended to be construed to include such variations except insofar as limited by prior art.

What is claimed is:

1. In a spiral chute for transporting articles from an upper location to a lower location comprising a plurality of molded spiral sections secured together around a center support pole with each of the spiral sections having an upper surface over which the articles move and an original spiral sidewall having an original radius, which original spiral sidewall is located to be contacted by the articles moving over the upper surface to keep the articles between the original spiral sidewall and the center support pole, the improvement comprising:

a plurality of removable spiral sidewall sections each having the same radius which radius is smaller than said original radius;

support means for supporting each of said removable spiral sidewall sections at a location between said original spiral sidewall and said center support pole to form a new spiral sidewall in order to accommodate articles of various widths; and each of said removable spiral sidewall sections having an outer surface and an inner surface located to be contacted by said articles moving over said upper surface to control the movement of said articles between said new spiral sidewall and said center support pole.

2. A spiral chute as in claim 1 wherein each of said support means comprise:

a support arm secured to said center pole and projecting outwardly therefrom;

a hanger arm secured to said support arm and extending downwardly therefrom;

mounting means having a flange projecting outwardly from said outer surface; and connecting means for connecting said flange to said hanger arm.

3. A spiral chute as in claim 2 and further comprising;

a first brace arm extending between and secured to said support arm and said center support pole.

4. A spiral chute as in claim 3 and further comprising:

a second brace arm extending between and secured to said support arm and said hanger arm.

5. A spiral chute as in claim 2 and further comprising:

each of said spiral sidewall sections having an upper edge and a lower edge; and adjusting means for permitting adjustment of said spiral sidewall sections to vary the distance between said lower edge and said upper surface.

6. A spiral chute as in claim 5 wherein said adjusting means comprise:

a plurality of spaced apart openings in each of said hanger arms; and a plurality of spaced apart slots in said flange.

7. A spiral chute as in claim 2 and further comprising:

each of said spiral sidewall sections having an upper end portion and a lower end portion; and a slip joint between said lower end portion of one of said plurality of spiral sidewall sections and said upper end portion of an adjacent one of said plurality of spiral sidewall sections.

8. A spiral chute as in claim 7 and further comprising:

a first brace arm extending between and secured to said support arm and said center support pole.

9. A spiral chute as in claim 8 and further comprising:

a second brace arm extending between and secured to said support arm and said hanger means.

10. A spiral chute as in claim 9 and further comprising:

each of said spiral sidewall sections having an upper edge and a lower edge; and adjusting means for permitting adjustment of said spiral sidewall sections to vary the distance between said lower edge and said upper surface.

11. A spiral chute as in claim 10 wherein said adjusting means comprise:

a plurality of spaced apart openings in each of said hanger arms; and a plurality of spaced apart slots in said flange.

* * * * *